SURFACE TREATED LITHOGRAPHIC PLATES AND PRODUCTION THEREOF
Original Filed May 6, 1960
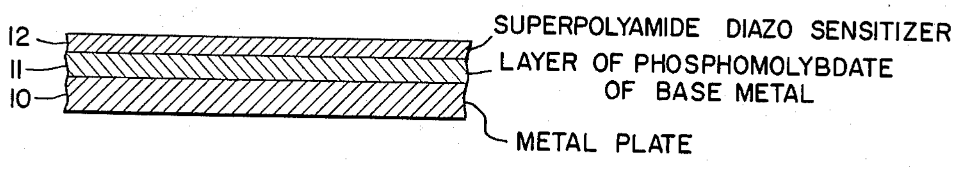
INVENTOR.
ROBERT F. LEONARD
BY
ATTORNEY 3,201,247
Patented Aug. 17, 1965

3,201,247

SURFACE TREATED LITHOGRAPHIC PLATES AND PRODUCTION THEREOF

Robert F. Leonard, East Rockaway, N.Y., assignor to Litho Chemical & Supply Co., Inc., Lynbrook, N.Y., a corporation of New York Continuation of application Ser. No. 27,240, May 6, 1960. This application Mar. 18, 1964, Ser. No. 352,825
15 Claims. (Cl. 96—75)

This application is a continuation of application Serial No. 27,240, filed May 6, 1960, now abandoned.

This invention relates to lithographic plates and a method of producing the same and more particularly to phosphomolybdate treated metal sheets useful in the preparation of lithographic printing plates.

Conventional lithographic plates such as zinc and aluminum sheets are presently employed in the lithographic industry for printing plates have recognized disadvantages. One of the serious disadvantages is that they become oxidized and hence the chemical properties of their surfaces continually undergo change. They thus present a storage problem due to oxidation and change under normal storage conditions. Another disadvantage of known plates is that they require counteretching prior to the application of the lightsensitive coating. Where albumin or equivalent sensitizer is left on non-image areas, scumming occurs as these areas tend to pick up ink during use of the plates and such is most undesirable as defective prints result despite the use of desensitizers for removing undeveloped sensitizer from the non-image areas. Such plates have a distinct tendency to accumulate sensitizer scum or to tone up during use. Conventional plates are also subject to corrosion during prolonged periods of storage. Prior plates, other than silicated plates, which have been presensitized are apt to deteriorate during storage so that they are not fit for use merely upon exposure to light through a negative or stencil and then washing away the unexposed light-sensitive material. Such plates, in particular, especially if they have undergone change or deterioration do not receive and hold well the light-sensitive diazo resin or other light-sensitive coating or maintain substantially constant permanency of condition. Prior plates are not characterized by long press life or freedom from halation. These and other disadvantages are overcome by the present invention.

It has now been found that by treating metal sheets with phosphomolybdate solutions and subsequently subjecting the thus-treated sheets to sealing operations, there results a conversion coating on the surfaces of the metal sheets and the so obtained phosphomolybdate treated metal sheets combine the desirable physical properties of the original sheets with the below-stated and other advantages of a phosphomolybdate surface. The sheets so produced are ideally suited for printing plates.

In the accompanying drawing, which is a fragmentary sectional view through a portion of a lithographic plate responding to the present invention, the numeral 10 designates a metal plate which is composed of or faced with zinc, aluminum or copper, the numeral 11 indicates a layer of the phosphomolybdate of the plate metal, and the numeral 12 designates a superpolyamide diazo sensitizer.

A phosphomolybdate treated metal sheet responding to this invention as compared with conventional aluminum and zinc sheets now used in the lithographic industry for printing plates has a number of important advantages and considerably greater versatility.

A phosphomolybdate treated plate does not oxidize under normal storage conditions. The chemical properties of the surfaces are therefore substantially constant and the storage problem is eliminated. In contrast, conventional zinc and aluminum sheets do oxidize and hence continually change with respect to the chemical properties of their surfaces and they thus present a storage problem.

A phosphomolybdate treated sheet has a permanent, durable, hydrophilic surface. A printing plate which does not have a hydrophilic surface in the non-printing areas has a tendency to scum because the non-image areas of the printing plate become ink-receptive. The phosphomolybdate treated plate with a hydrophilic image greatly reduces or eliminates scumming.

A phosphomolybdate treated sheet does not require counteretching prior to the application of the light-sensitive coating to the sheet, whereas counteretching is standard procedure in the processing of zinc and aluminum plates of conventional character. Counteretching involves scrubbing the plates with an acidic solution to remove loose soil and oxide neither of which is present on the surface of a phosphomolybdate treated plate or sheet.

The phosphomolybdate treated plate has the further advantage over a conventional lithographic plate in that all traces of casein, albumin, etc. can be positively removed from the plate in the first instance without dependence upon any separate chemical desensitizing procedure.

The phosphomolybdate treated plate is characterized by being utilizable for all three types of lithographic processes, namely, the Deep Etch Process, the Surface Process and the Wipe-On Process. In the Deep Etch Process, a bichromated-gum arabic solution is dried onto the plate surface, exposed through a photographic positive to a light source, developed with an acidic aqueous salt solution, thereby washing away unexposed sensitizer, etched with an acidic ferric chloride solution, optionally plated with electroless copper, lacquered and inked. The light-hardened stencil is then washed off the plate. The areas of the plate which contained the stencil are now the non-printing areas while the areas which have been developed, etched, copperized, lacquered and inked are the printing areas. In the Surface Process, a bichromated casein solution is dried onto the plate surface, exposed through a photographic negative to a light source, coated with a layer of lacquer and then ink, and developed with a slightly ammoniacal solution. The areas of the plate which contained the unexposed, developed (washed away) sensitizer becomes the non-printing areas while the light-exposed, lacquered and inked areas are the printing areas. In the Wipe-On Process, a diazo resin solution or a diazo resin combined with a colloid solution is hand coated onto the plate surface, the plate is next exposed through a photographic negative, coated with a layer of ink and developed with an acidic gum arabic solution or the exposed plate may be lacquered and developed in one operation with the use of a lacquer emulsion developer. The unexposed areas of the plate which were developed and washed away become the non-printing areas of the plate while the exposed areas of the plate which were lacquered or inked become the printing areas of the plate.

While conventional zinc and aluminum plates can be used in the Deep Etch and Surface Processes, they have a tendency to "scum" and must first be counteretched.

Light-sensitive diazo resins and similar light-sensitive materials are notably sensitive to metals and thus a conventional zinc or aluminum plate cannot be used for Wipe-On platemaking, whereas a phosphomolybdate treated plate is ideally suited for the Wipe-On Process.

A silicated plate can be used for wipe-on platemaking, but cannot be penetrated with the etches commonly used in deep etch platemaking whereas a phosphomolybdate treated plate is suitable for deep etch platemaking since it can be etched with convention deep etch etches.

A lithographic plant could, if so desired, use and store a single type of lithographic printing plate for all three lithographic platemaking processes referred to above by using a phosphomolybdate treated zinc or aluminum plate according to the present invention which, however, also includes the use of phosphomolybdate treated copper sheets or plates.

The phosphomolybdate treated plate can be presensitized with light-sensitive diazo resins and other like light-sensitive organic materials and can then be stored for periods up to several months without loss of photographic sensitivity.

Phosphomolybdate treated plates according to this invention have been produced with two different types of surface roughness, namely, "smooth surface" plates produced by chemical etching and "grained" plates produced by mechanical surface treatment, both being carried out prior to the phosphomolybdate treatment. On a theoretical basis, the smoother the surface of a lithographic plate the greater is the resolution of halftone dots; on the other hand, the greater the surface roughness of the plate the greater is the capacity of the plate to carry ink and water. There are, consequently, two types of plates in general use, the "smooth surface" plate exemplified by the chemically etched plate and the "grained" plate exemplified by the mechanically surfaced plate.

This invention is applicable both to "smooth surface" plates and to "grained" plates as illustrated by the following non-limitative examples.

EXAMPLE 1

*Production of a phosphomolybdate treated sheet with a chemically etched surface*

A 10" x 15" x 0.006" sheet of Alcoa 2S aluminum was immersed for two minutes at 140° F. in a combination cleaner and etch prepared by mixing the following ingredients in the order listed:

| | | |
|---|---|---|
| Water | ml | 3785 |
| Sodium phosphate tribasic | grams | 28.35 |
| Sodium hydroxide | do | 141.75 |
| Wetting agent (Tergitol non-ionic NPX) (alkyl phenyl ether of polyethylene glycol sold by Union Carbide Corp.) | ml | .38 |

The sheet was rinsed thoroughly with deionized water at 68° F., then immersed in a desmutting bath prepared as follows:

| | | |
|---|---|---|
| Nitric acid (70%) | ml | 1500 |
| Hydrofluoric acid (52–55%) | ml | 500 |

at room temperature for thirty seconds. The slightly grained aluminum was thoroughly rinsed with deionized water at 68° F. before being immersed in the phosphomolybdate bath at 165° F. for two minutes. The bath was prepared by mixing the following in the order listed:

| | | |
|---|---|---|
| Water | ml | 7000 |
| Molybdic acid | grams | 175.2 |
| Sodium phosphate tribasic | do | 34.9 |

After rinsing thoroughly with deionized water at 68° F., the treated aluminum was immersed in a sealing bath for two minutes at 210° F. The bath is composed of the following:

| | | |
|---|---|---|
| Water | ml | 9900 |
| Sodium acetate | grams | 100 |

The sheet was thoroughly rinsed with deionized water at 68° F. and finally forced air dried.

EXAMPLE 2

*Production of a phosphomolybdate treated sheet with a mechanical grain*

A 20" x 22" x 0.12" sheet of Alcoa 2S aluminum was cleaned and degreased by immersion at 68° F. for fifteen minutes in the following:

| | | |
|---|---|---|
| Water | liters | 4.8 |
| Ethylene glycol monoethyl ether | do | 3.2 |
| Sodium carbonate | grams | 86 |
| Sodium phosphate tribasic | do | 28.4 |

The sheet was rinsed with water at 65° F. for two minutes before being grained. The graining consisted of passing the sheet in a horizontal plane under a set of revolving brass brushes which are located on the perimeter of a rotating circular support. During this operation, the plate is flushed with a slurry of water and pumice powder. The aluminum sheet was rinsed thoroughly with water at 65° F. and then immersed in the above water, ethylene glycol monoethyl ether, sodium carbonate, sodium phosphate tribasic cleaner for five minutes at 68° F. The plate was then rinsed thoroughly with water at 65° F. and then immersed in the phosphomolybdate solution at 160° F. for two minutes. The bath consisted of the following:

| | | |
|---|---|---|
| Water | gallons | 30 |
| Molybdic acid | grams | 2480 |
| Sodium phosphate tribasic | do | 566 |

The sheet was rinsed for two minutes with tap water at 65° F. before being immersed in the sealing bath at 210° F. for two minutes. The sealing bath consisted of:

| | | |
|---|---|---|
| Water | gallons | 30 |
| Sodium acetate | grams | 1225 |

The sheet was rinsed with water at 65° F. for two minutes, then forced air dried. Finally, the sheet was passed at a distance of six inches over a series of lighted gas burners for forty seconds to completely seal the phosphomolybdate surface.

The molybdic acid referred to in Examples 1 and 2 is molybdic acid 85% of which is a commercially known product composed of ammonium para-molybdate with added molybdic oxide. The molybdic oxide amounts to 85% of the weight of the product which produces molyddic oxide when the product is dissolved in water. The molybdic oxide combines with phosphate ions present in the treating bath to form phosphomolybdate ions in solution. The sodium and ammonium ions present in the phosphomolybdate solution, resulting from the combining of the molybdic acid 85% and the tribasic sodium phosphate, remain as free ions as long as they are in solution. The phosphomolybdate ions can, however, be produced in other ways without adversely affecting the working characteristics of the treatment bath. Either of the following baths A or B can be used in place of those of Examples 1 and 2, viz.:

| | | |
|---|---|---|
| A. Water | ml | 1000 |
| Sodium phosphomolybdate ($Na_3PO_4 \cdot 12MoO_3$) | grams | 20 |
| Sodium hydroxide | do | 5 |

Bath A was used on a chemically grained aluminum plate at 160° F. to 170° F. for two minutes. The remainder of the treatment was the same as Example 1.

| | | |
|---|---|---|
| B. Water | ml | 1000 |
| Ammonium molybdate [$(NH_4)_6Mo_7O_{24} \cdot 4H_2O$] | grams | 50 |
| Phosphoric acid (85%) | ml | 1.25 |
| Sulfuric acid (98%) | ml | 1.00 |

Bath B was used on a chemically grained aluminum plate at 180° F. for two minutes. The remainder of the treatment was the same as Example 1.

It has been found that, in regard to treating metallic sheets, the best phosphomolybdate solutions are those which contain 12 to 16 moles of molybdic oxide to 1 mole of phosphate. It appears, therefore, that either phospho-12-molybdate ions or phospho-18-molybdate ions, or a combination of both, are formed in solution and ultimately react with the aluminum, zinc or copper to form the corresponding metallic phosphomolybdate.

It has further been found that the above reaction is best promoted, without attacking the metal sheet, at a pH in the range of 4 to 6.

It is further to be understood that the concentration of solids in the phosphomolybdate bath of Examples 1 and 2 can be varied materially as long as the molybdic oxide-phosphate ion molar ratio is maintained constant. The bath can thus range in its components as follows:

| | | |
|---|---|---|
| Water | ml | 1000 |
| Molybdic acid (85%) | grams | 9.1 to 37.7 |
| Sodium phosphate tribasic | do | 1.8 to 7.5 |

If the molybdic acid 85% and sodium phosphate tribasic concentrations exceed 37.7 and 7.5 grams, respectively, the phosphomolybdate bath will soon form a precipitate and become unusable; if, on the other hand, the molybdic acid 85% and sodium phosphate tribasic concentrations are below 9.1 and 1.8 grams, respectively, the metal sheet will require longer than two minutes at 155° F. to 180° F. and hence the operation becomes uneconomical.

The optimum temperature range for use of the phosphomolybdate solutions is between 155° F. and 180° F. At a temperature below 155° F. the reaction is slowed down appreciably and the process becomes uneconomical and when the temperature is above 180° F. the bath gradually forms a precipitate and has only a limited storage life.

The following phosphates have been successfully used in varying proportions to supply the required phosphate ions in the treatment bath:

Phosphoric acid (85%)
Ammonium phosphate, monobasic
Sodium phosphate, dibasic
Sodium phosphate, tribasic No phosphate ion source has been found which did not operate satisfactorily as long as the pH of the resulting phosphomolybdate solution was adjusted to pH 4 to 6.

Molybdic acid 85% and ammonium molybdate are suitable sources of molybdic oxide and produce satisfactory results when combined with the proper amount of phosphate ion as long as the pH is in the range of 4 to 6. They are equally as good as the sodium phosphomolybdate mentioned above.

The sealing bath described above consists of a 1% (by weight) aqueous solution of sodium acetate. Tests showed no advantage in using a sealing bath of 10% concentration and hence a 1% solution is preferred. The sealing bath is, however, not limited to a 1% solution of sodium acetate as any of the following chemicals can also be used in a 1% by weight concentration in water at 200° F. to 212° F. to form a satisfactory sealing bath: Dibasic sodium phosphate, potassium acetate, magnesium acetate, barium acetate, calcium acetate, dibasic ammonium carbonate, barium carbonate, calcium carbonate, lithium carbonate, magnesium carbonate, zinc carbonate, ammonium hydroxide and urea.

The following chemicals when used in a 1% concentration at 200° F. to 212° F. did not produce a satisfactory sealing bath: Ammonium phosphate (monobasic), sodium phosphate (monobasic), sodium phosphate (tribasic), potassium phosphate (monobasic), magnesium phosphate (dibasic), ammonium acetate, zinc acetate, sodium carbonate (dibasic), potassium carbonate (dibasic), potassium oxalate, ammonium oxalate, sodium oxalate, sodium citrate, potassium citrate, ammonium citrate, calcium citrate, magnesium citrate, sodium nitrate, potassium nitrate, ammonium nitrate, calcium nitrate, magnesium nitrate, zinc nitrate, aluminum nitrate, barium nitrate, sodium chloride, potassium chloride, ammonium chloride, lithium chloride, calcium chloride, zinc chloride, barium chloride, sodium sulfate (dibasic), potassium sulfate (dibasic), calcium sulfate, zinc sulfate and magnesium sulfate.

From phosphomolybdate treated aluminum plates prepared according to Example 1, there have been produced nylon-diazo presensitized plates in which the nylon-diazo sensitizer corresponds to the sensitizer described in United States Patent No. 2,826,501. The nylon-diazo sensitizer in conjunction with the phosphomolybdate treated aluminum plate produces a markedly superior plate as compared to the use of the same nylon-diazo sensitizer in conjunction with a silicated aluminum plate. The plate produced by the nylon-diazo sensitizer on the silicated surface is photographically too fast for lithographic purposes whereas the same sensitizer on a phosphomolybdate surface is ideal for lithographic purposes.

Phosphomolybdate treated aluminum plates prepared according to Example 2 have been very satisfactorily used to produce deep etch plates, surface plates and wipe-on diazo plates.

As pointed out above, plates or sheets of zinc, aluminum and copper can all be beneficially phosphomolybdate treated and all are suitable for lithographic printing plates.

The presensitized plates referred to above are prepared by making a chemically grained phosphomolybdate treated plate as already described, applying thereto the nylon-diazo resin solution of United States Patent No. 2,826,501 by wiping the same on by hand or by means of a roller and then air drying the coating thus produced. The presensitized plate is then processed by exposing the coating to a light source through a stencil or negative, developing or washing away the unexposed areas with the developer of United States Patent No. 2,826,501, applying a lacquer like that of United States Patents Nos. 2,754,279 or 2,865,873, and rinsing with water.

The nylon-diazo resin solution of Patent No. 2,826,501 is composed of the following constituents in approximately the following amounts, by weight:

0.11% of the water soluble condensation product of p-diazo diphenylamine and formaldehyde,
0.94% of soluble superpolyamide nylon resin,
0.01% of a non-ionic surface active agent (100%),
17.15% of water,
76.35% of denatured ethyl alcohol, and
5.44% of furfuryl alcohol.

The developer of Patent No. 2,826,501 is composed of the following constituents:

| | | |
|---|---|---|
| Citric acid | grams | 1.2 |
| N,N-dimethylformamide | mililiters | 124.5 |
| Furfuryl alcohol | do | 55.2 |
| Methanol | do | 375.0 |

In a typical application of the Deep-Etch Process, a mechanically grained plate produced as in Example 2 is centrifugally coated with a bichromated gum arabic solution according to the recommendations of the Lithographic Technical Foundation Publication No. 806. Such solution contains water, gum arabic, ammonium bichromate, a wetting agent (surfactant), a blue dye and ammonium hydroxide. The basic coating solution contains 2840 milliliters of 14° Baumé gum arabic solution, 950 milliliters of ammonium bichromate stock solution (758 grams of photo grade ammonium bichromate in enough water to make one gallon of 14.2° Baumé at 77° F.), and 140 milliliters of ammonium hydroxide (28% $NH_3$) to which the other ingredients are added. The coating solution has a pH value of 8.8 to 9.0 and tests between 14.0° and 14.2° Baumé at 77° F. Whirling is continued until the coating dries and the coated plate is then exposed to a light source through a suitable positive. The unexposed areas are developed or washed away with an aqueous acidic salt solution of calcium chloride in water to which lactic acid has been added according to the recommendations of Lithographic Technical Foundation Publication No. 806, e.g.:

| | | |
|---|---|---|
| Zinc chloride (technical) | grams | 680 |
| Calcium chloride (commercial) | do | 1360 |
| Water | milliliters | 1890 |
| Lactic acid (85%) | do | 340 |

The bared metal is etched in acidic ferric chloride solution according to the recommendations of the above publication, e.g.:

| | | |
|---|---|---|
| Calcium chloride solution (40–41° Bé.) | ml | 2630 |
| Zinc chloride (technical) | grams | 1000 |
| Iron perchloride solution (50–51° Bé.) | ml | 750 |
| Hydrochloric acid (37–38.5%) | ml | 37 |
| Cupric chloride | grams | 70 |

The plate is next washed with anhydrous alcohol to remove salts and water and a laquer film applied by hand to the thus treated plate and allowed to dry, following which a developing ink is applied by hand and allowed to dry. The plate is now soaked in warm water which penetrates to the exposed coating leaving the plate with inked image areas. The non-printing areas are hydrophilic due to the previous treatment of the plate.

In a typical application of the Wipe-On Process, using diazo resin solution, a mechanically grained plate produced as in Example 2 is wiped on with a pool of diazo resin solution and smoothed down with a soft non-abrasive applicator and allowed to air dry. The diazo resin solution is a 1 to 5%, by weight, aqueous solution of the condensation product of p-diazo diphenylamine and formaldehyde. The plate is next exposed to actinic light rays through a photographic negative and is finished in either of the following ways:

(A) A developing ink of known composition is applied in the same manner as the diazo resin solution and developed with a developer such as one composed of water, gum arabic and phosphoric acid. The developer penetrates through the ink and removes, by dissolving, the unexposed diazo sensitizer coating. The image areas are exposed water-insolubilized diazo resin covered by greasy ink and the non-printing areas are hydrophilic phosphomolybdated surfaced.

(B) A lacquer emulsion the same as or similar to that of United States Patent No. 2,865,873 is applied. The image areas are exposed water-insolubilized diazo resin covered by the lacquer composition and the background or non-printing areas are hydrophilic phosphomolybdated treated surfaces.

The Surface Process is carried out according to the recommendations of the Lithographic Technical Foundation Publication No. 807, the contents of which are hereby made a part hereof. The plates are termed surface plates and are plates which have been exposed through negatives and on which the exposed coating serves as a base for the ink-receptive image. In general, an aluminum sheet is grained in known manner and cleaned with a counteretch such as acetic acid in water. A light-sensitive coating is applied, with or without (usually without) a prior pre-etch with the same plate etch used for desensitizing. The coating solution is a mixture of a solution of ammonium bichromate and a solution of a colloid such as albumin, casein, gum arabic, gelatin or cellulose gum. The coated plate is exposed to light through a negative to form the image or printed areas. Light passing through the clear portions of the negative hardens or tans the coating under these areas. Any suitable available commercial lacquer is applied to the exposed surface plate and serves as protection for the image areas. A developing ink is then applied to the exposed plate to place a greasy, ink-receptive layer on the image areas and the plate is developed to remove unexposed coating from the non-image areas. The usual finishing operations are then carried out, all as described in the said publication No. 807.

What is claimed is:

1. A method of preparing a phosphomolybdate treated lithographic plate which comprises immersing at a temperature of 155 to 180° F. a cleaned metal plate in an aqueous bath consisting essentially of water, phosphomolybdate ions and cations therefor, said bath having a pH of about 4 to 6, to form on the plate surfaces the phosphomolybdate reaction product of the plate metal, sealing the coating thus formed by immersion in a sealing bath at a temperature of 200° F. to 212° F., drying the thus treated plate and applying thereto a water-soluble diazo resin sensitizer coating.

2. A lithographic plate comprising a metal selected from the group consisting of zinc, aluminum and copper, at least one of the surfaces of said plate being composed of the phosphomolybdate of the plate metal formed by the reaction at a temperature of 155° F. to 180° F. of said plate metal with a solution consisting essentially of water, phosphomolybdate ions and cations therefor, said solution having a pH of about 4 to 6, and a water-soluble superpolyamide diazo sensitizer coating provided over and in contact with the thus phosphomolybdated plate surface.

3. A presensitized plate suitable for lithographic printing and capable of being stored and used months after manufacture comprising an aluminum sheet provided on at least one surface thereof with a scum-preventing and tone-reducing coating consisting essentially of an aluminum phosphomolybdate film formed by the reaction at a temperature of 155° F. to 180° F. of an aqueous solution having a pH of about 4 to 6 and consisting essentially of water, phosphomolybdate ions and cations therefor with the metal of the surface of said aluminum sheet, said film overlying and being firmly bonded to said surface of said sheet and being substantially free of water-soluble material, said film being further characterized in that it is capable of causing an insolubilized superpolyamide diazo image to adhere strongly to the surface of the sheet, and over and in contact with said film a thin coating of a water-soluble superpolyamide diazo sensitizer which, upon exposure of the plate to ultraviolet light through a negative, will react in the exposed areas to form an alcohol- and water-insoluble hydrophobic and organophilic material which is tightly bonded to said film to provide a printing image, the unexposed areas being readily washed away leaving the film bare in said areas and the film acting to prevent the metal from causing decomposition of the superpolyamide diazo sensitizer, whereby the presensitized plate is provided with a long shelf life.

4. A presensitized plate suitable for lithographic printing and capable of being stored and then used up to months after manufacture comprising a thin metal sheet selected from the group consisting of aluminum, zinc and copper which has on at least one surface thereof a phosphomolybdate film of the plate metal which has been formed thereon by reacting at a temperature of 155° F. to 180° F. a surface of said plate with an aqueous solution consisting essentially of water, phosphomolybdate ions and cations therefor and having a pH of about 4 to 6, said film overlying and being firmly bonded to said surface of said sheet and being substantially free from water-soluble material, said film having the capacity of causing an insolubilized superpolyamide diazo image to adhere strongly to the sheet surface, and over and in contact with said film a coating of a water-soluble superpolyamide diazo sensitizer which, upon exposure of the plate to ultraviolet light through a negative, will react in the exposed areas to form an alcohol- and water-insoluble hydrophobic and organophilic material tightly bonded to said film and providing a printing image, the light-sensitive material being readily washed away from the unexposed areas leaving the film bare in said areas and the film acting to prevent the metal from decomposing the superpolyamide diazo sensitizer, thereby providing long shelf life for the resulting presensitized plate.

5. A presensitized plate suitable for lithographic printing and capable of being stored and then used up to months after manufacture comprising a thin metal sheet selected from the group consisting of aluminum, zinc and copper which has on at least one surface thereof a phosphomolybdate film of the plate metal which has been formed thereon by reacting at a temperature of 155° F. to 180° F. a surface of said plate with an aqueous solution consisting essentially of water, phosphomolybdate ions and cations therefor and having a pH of about 4 to 6, said film overlying and being firmly bonded to said surface of said sheet and being substantially free from water-soluble material, said film having the capacity of causing an insolubilized superpolyamide diazo image to adhere strongly to the sheet surface, and over and in contact with said film a coating of a water-soluble superpolyamide diazo sensitizer which, upon exposure of the plate to ultraviolet light through a negative, will react in the exposed areas to form an alcohol- and water-insoluble hydrophobic and organophilic material tightly bonded to said film and providing a printing image, the light-sensitive material being readily washed away from the unexposed areas leaving the film bare in said areas and the film acting to prevent the metal from decomposing the superpolyamide diazo sensitizer, thereby providing long shelf life for the resulting presensitized plate, said aqueous solution being prepared from the following constituents in the following relative amounts:

| | |
|---|---|
| Water ____milliliters__ | 7000 |
| Molybdic acid ____grams__ | 175.2 |
| Tribasic sodium phosphate ____do____ | 34.9 |

6. A presensitized plate suitable for lithographic printing and capable of being stored and then used up to months after manufacture comprising a thin metal sheet selected from the group consisting of aluminum, zinc and copper which has on at least one surface thereof a phosphomolybdate film of the plate metal which has been formed thereon by reacting at a temperature of 155° F. to 180° F. a surface of said plate with an aqueous solution consisting essentially of water, phosphomolybdate ions and cations therefor and having a pH of about 4 to 6, said film overlying and being firmly bonded to said surface of said sheet and being substantially free from water-soluble material, said film having the capacity of causing an insolubilized superpolyamide diazo image to adhere strongly to the sheet surface, and over and in contact with said film a coating of a water-soluble superpolyamide diazo sensitizer which, upon exposure of the plate to ultraviolet light through a negative, will react in the exposed areas to form an alcohol- and water-insoluble hydrophobic and organophilic material tightly bonded to said film and providing a printing image, the light-sensitive material being readily washed away from the unexposed areas leaving the film bare in said areas and the film acting to prevent the metal from decomposing the superpolyamide diazo sensitizer, thereby providing long shelf life for the resulting presensitized plate, said aqueous solution being prepared from the following constituents in the following relative amounts:

| | |
|---|---|
| Water ____milliliters__ | 1000 |
| Molybdic acid ____grams__ | 9.1 to 37.7 |
| Tribasic sodium phosphate ____do____ | 1.8 to 7.5 |

7. A presensitized lithographic plate comprising an aluminum sheet having at least one smooth surface thereof rendered permanently hydrophilic by treatment at a temperature of 155° F. to 180° F. with an aqueous solution having a pH of about 4 to 6 and consisting essentially of water, phosphomolybdate ions and cations therefor thereby forming aluminum phosphomolybdate on the treated surface of the aluminum sheet as a thin layer of the reaction product of the aluminum and the phosphomolybdate ions in said solution, a thin coating of an alcohol- and water-soluble superpolyamide diazo sensitizer which, upon exposure to ultraviolet light through a negative, will react in the exposed areas to form an image of alcohol- and water-insoluble hydrophobic and organophilic material bonded to said surface, the unexposed areas being readily washed away from the exposed areas thus leaving the said permanently hydrophilic surface bare in the washed-away areas.

8. A plate suitable for use in lithographic printing comprising an aluminum sheet at least one surface of which is provided with a layer of the reaction product formed at a temperature of 155° F. to 180° F. by contacting said surface with an aqueous solution having a pH of about 4 to 6 and consisting essentially of water, phosphomolybdate ions and cations therefor to form aluminum phosphomolybdate as a permanently hydrophilic coating substantially free from water-soluble materials, and thereover a coating of an alcohol- and water-soluble superpolyamide diazo sensitizer which, upon exposure to ultraviolet light through a negative, reacts in the exposed areas to form an image of alcohol- and water-insoluble hydrophobic and organophilic material bonded to said permanently hydrophilic coating.

9. A plate suitable for use in lithographic printing comprising a sheet at least one surface of which is a metal selected from the group consisting of aluminum, zinc and copper and over and bonded to said metal surface an extremely thin layer of the reaction product at a temperature of 155° F. to 180° F. of said metal and an aqueous solution having a pH of about 4 to 6 and consisting essentially of water, phosphomolybdate ions and cations therefor thereby forming the phosphomolybdate of the plate metal to provide a permanently hydrophilic surface on said plate metal which surface is substantially free of water-soluble materials and which is provided thereover with a thin coating of an alcohol- and water-soluble light-sensitive superpolyamide diazo resin.

10. A plate suitable for use in lithographic printing comprising a thin aluminum sheet at least one of the surfaces of which is provided with a layer of the reaction product formed at a temperature of 155° F. to 180° F. by contacting said aluminum surface with an aqueous solution having a pH of about 4 to 6 and consisting essentially of water, phosphomolybdate ions and cations therefor, said reaction product being aluminum phosphomolybdate which constitutes a permanently hydrophilic layer substantially free of water-soluble materials and on said layer a coating of a water-soluble superpolyamide diazo sensitizer which, upon exposure to ultraviolet light through a negative, will react in the exposed areas to form an image of water-insoluble hydrophobic and organophilic material bonded to said permanently hydrophilic surface.

11. A plate suitable for use in lithographic printing comprising a thin sheet having as at least one surface thereof a metal selected from the group consisting of aluminum, zinc and copper, and over and bonded to said metal surface an extremely thin layer of the reaction product formed at a temperature of 155° F to 180° F. by contacting said metal surface with an aqueous solution having a pH of about 4 to 6 and consisting essentially of water, phosphomolybdate ions and cations therefor, said reaction product being the phosphomolybdate of the plate metal and constituting a permanently hydrophlic surface for said sheet which surface is substantially free of water-soluble materials, and a thin coating of an initially water-soluble light-sensitive superpolyamide diazo resin on said permanently hydrophilic surface.

12. A plate suitable for use in lithographic printing comprising an aluminum sheet at least one of the surfaces of which is provided with a film consisting essentially of the reaction product formed at a temperature of 155° F. to 180° F. by contacting said surface with an aqueous solution having a pH of about 4 to 6 and consisting essentially of water, phosphomolybdate ions, and cations therefor, said reaction product being aluminum phosphomolybdate and constituting a permanently hydrophilic surface for said sheet substantially free of water-soluble materials and over and in contact with said permanently hydrophilic surface a coating of a water-soluble light-sensitive bichromated gum arabic which, when exposed to actinic light through a positive, forms a stencil after washing away unexposed areas with a saline solution, the plate being thereafter suitably finished.

13. A plate suitable for use in lithographic printing composed of a metal selected from the group consisting of aluminum, zinc and copper and over and bonded to at least one surface of said metal an extremely thin layer of the reaction product formed at a temperature of 155° F. to 180° F. by contacting said metal surface with an aqueous solution having a pH of about 4 to 6 and consisting essentially of water; phosphomolybdate ions and cations therefor, said reaction product being the phosphomolybdate of the plate metal and contituting a permanently hydrophilic surface for said sheet which is substantially free of water-soluble material, and a thin coating of a water-soluble light-sensitive bichromated gum arabic on said permanently hydrophilic surface.

14. A plate suitable for use in lithographic printing comprising an aluminum sheet having on at least one surface thereof a film of the reaction product formed at a temperature of 155° F. to 180° F. by contacting said aluminum surface with an aqueous solution having a pH of about 4 to 6 and consisting essentially of water, phosphomolybdate ions, and cations therefor, said reaction products being aluminum phosphomolybdate and constituting a permaently hydrophilic surface for said sheet substantially free of water-soluble materials and said permanently hydrophilic surface being coated with a water-soluble light-sensitive bichromated casein which, upon exposure to ultraviolet light through a negative, reacts in the exposed portions to form a water-insoluble hydrophobic and organophilic image tightly bonded to said permanently hydrophilic surface.

15. A plate suitable for use in lithographic printing comprising a sheet at least one of the surfaces of which is a metal selected from the group consisting of aluminum, zinc and copper, and upon and bonded to the said surface an extremely thin layer of the reaction product formed at a temperature of 155° F. to 180° F. by contacting said metal surface with an aqueous solution having a pH of about 4 to 6 and consisting essentially of water, phosphomolybdate ions and cations therefor, said reaction product being the phosphomolybdate of the plate metal and constituting a permanently hydrophilic surface for said sheet substantially free of water-soluble material and the thus treated surface having thereon a thin coating of a water-soluble light-sensitive bichromated casein.

References Cited by the Examiner

UNITED STATES PATENTS

| | | | |
|---|---|---|---|
| 2,826,501 | 3/58 | Hodgins | 96—33 X |
| 3,010,390 | 11/61 | Buskes | 96—33 X |
| 3,030,210 | 4/62 | Chebiniak | 96—33 X |

NORMAN G. TORCHIN, *Primary Examiner.*